United States Patent
Tonellot et al.

(10) Patent No.: US 6,522,973 B1
(45) Date of Patent: Feb. 18, 2003

(54) METHOD FOR 2D OR 3D MODELLING OF A HETEROGENEOUS MEDIUM SUCH AS THE SUBSOIL DESCRIBED BY ONE OR MORE PHYSICAL PARAMETERS

(75) Inventors: Thierry Tonellot, Rueil Malmaison (FR); Daniéle Mace-Prieur, Rueil Malmaison (FR); Vincent Richard, Paris (FR); Michel Cuer, Montpellier (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/698,164

(22) Filed: Oct. 30, 2000

(30) Foreign Application Priority Data

Oct. 29, 1999 (FR) .............................. 99 14027

(51) Int. Cl.[7] ................................................. G01V 1/28
(52) U.S. Cl. ........................................... 702/16; 367/73
(58) Field of Search ............................... 702/16; 367/73

(56) References Cited

U.S. PATENT DOCUMENTS

| | | | |
|---|---|---|---|
| 4,972,383 A | * 11/1990 | Lailly | 367/38 |
| 5,321,613 A | 6/1994 | Porter et al. | 364/420 |
| 5,764,515 A | 6/1998 | Guerillot et al. | |
| 5,798,982 A | 8/1998 | He et al. | 367/73 |
| 6,374,201 B1 | 4/2002 | Grizon et al. | |

OTHER PUBLICATIONS

Lortzer, G. J.M. et al: "An Integrated Approach to Lithologic Inversion–Part I Theory", Geophysics, U.S. Society of Exploration Geophysicists, Tulsa, vol. 1, 57, No. 2, Feb. 1, 1992, pp. 233–244, XP000330780, ISSN: 0016–8033, pp. 240–241.

* cited by examiner

Primary Examiner—Edward Lefkowitz
Assistant Examiner—Anthony Gutierrez
(74) Attorney, Agent, or Firm—Antonelli, Terry, Stout & Kraus, LLP

(57) ABSTRACT

A method of obtaining a representative 2D or 3D model of a heterogeneous medium described by multiple physical parameters (such as the impedances of the subsoil in relation to P or S type waves, its density, etc.) from various data. An a priori model with multiple parameters formed from known or estimated isolated values of the physical parameters and the initial model is improved by minimizing a global cost function representative, on the one hand, of the differences between synthetic records giving the response of the current model and the seismic records obtained, and on the other hand of the differences between the current model and the a priori model. These differences are measured in the sense of norms deduced from the a priori information on the uncertainties relative to the data and to the model, and the information can vary from one point of the model to another. The invention has an application for characterization of hydrocarbon reservoirs.

54 Claims, 9 Drawing Sheets

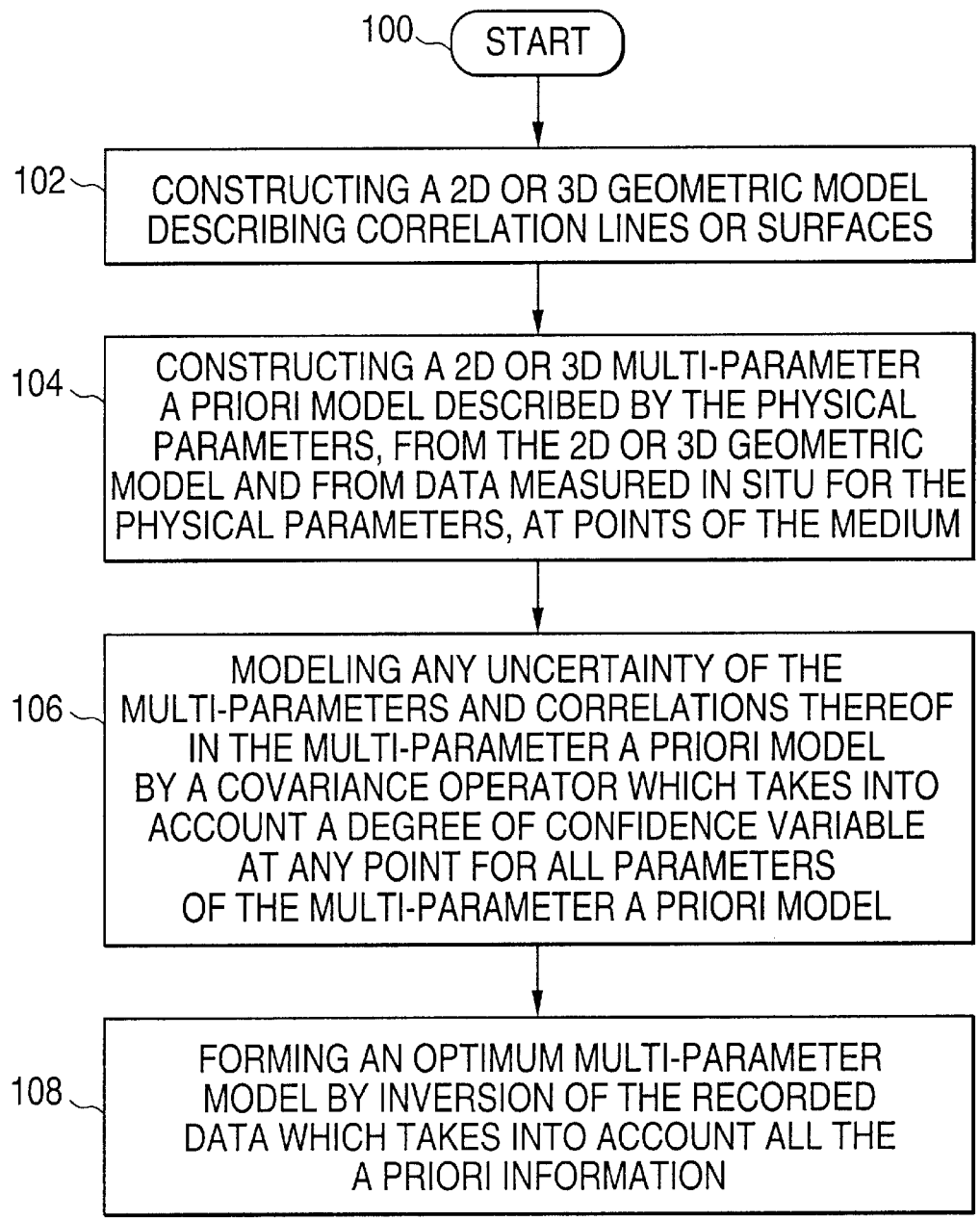

METHOD FOR 2D OR 3D MODELLING OF A HETEROGENEOUS MEDIUM SUCH AS THE SUBSOIL DESCRIBED BY ONE OR MORE PHYSICAL PARAMETERS

BACKGROUND OF THE INVENTION

1. Field of the Invention

The invention relates to a method of obtaining a 2D or 3D model if representative of a heterogeneous medium such as the subsoil, described by physical parameters or quantities, from data obtained by indirect measurements obtained from outside the medium, and other data, notably a set of isolated data measured in situ, all these data forming the a priori known information on the medium.

2. Description of the Prior Art

In the case of a medium such as the subsoil, the descriptive physical parameters are for example the impedance thereof in relation to P waves or S waves, or the density thereof. The direct and indirect data available are for example logs, seismic exploration data, and other data obtained from previous geologic surveys of the medium.

The waves emitted in the medium by a seismic source are propagated in the subsoil and are reflected on the discontinuities of the medium. They are recorded by pickups coupled with the underground formation and collected by an acquisition device.

Inversion methods have been developed, which connect a physical quantity of a heterogeneous medium such as the impedance thereof in relation to elastic waves to seismic data, to data measured in situ and to observations or interpretations.

A starting point is defining an a priori (1D, 2D or 3D) model of one or more physical parameters of the medium constructed by interpretation of known data, and covariance operators describing uncertainties about the a priori model and uncertainties about the known data. Synthetic seismograms, which constitute the response of the model, are constructed. The synthetic seismograms are compared with the real seismograms obtained by seismic exploration and the differences observed are gradually minimized according to norms associated with covariance operators selected according to an evaluation of the uncertainties about the a priori model and the seismic records.

The various known approaches differ notably in the number of physical parameters describing the medium, the dimension of the a priori model and the vast amount of possibilities offered when taking account of the uncertainty parameters. The known approaches obtain the optimum model minimizing an objective function, the sum of an objective function referred to as seismic and of an objective function referred to as geologic.

The seismic objective function represents the difference (in the sense of the norm induced by the covariance operator relative to the data) between the observed data and the synthetic data. The synthetic data are obtained by accounting for a complex propagation model.

The geologic objective function measures the difference in relation to the a priori model (in the sense of the norm induced by the covariance operator relative to the medium).

An example of one of these methods is described by Brac J. et al; <<Inversion with A Priori Information: an Approach to Integrated Stratigraphic Interpretation>>; in Sheriff R. E. Ed., Reservoir Geophysics, Soc. Expl. Geophys., Investigations in Geophysics 7.

Another method of 2D modeling of a physical quantity by stratigraphic inversion is also described in U.S. Pat. No. 4,972,383 filed by assignee.

French Patent No. 2,765,692 filed by the assignee describes a method of the same type intended for 3D modeling of a physical parameter or quantity such as the impedance of a heterogeneous medium, with construction of an a priori model from a 3D geometric model comprising several foliated volumes (sedimentary units) and also from known values of the quantity at several points of the medium, selection of a covariance model along the sheets of the various volumes and formation of an optimum model by means of an inversion process from the a priori model.

The previous methods model only the variation of a single physical parameter in the medium considered. Furthermore, the parameters used to describe the uncertainties about the a priori model (parameters defining the covariance operator) are constant throughout the domain or per geologic unit.

There are methods allowing modeling several physical quantities or parameters in a medium. They are notably described by:

Simmons and Backus, 1996: <<Waveform-based inversion and AVO prediction-error>>, in Geophysics, 61, p. 1575–1588, or by Pan et al., 1994: <<An Integrated Target Oriented Prestack Elastic Waveform Inversion: Sensitivity, Calibration and Application)), in Geophysics, 59, 9, p. 1392–1404.

However, the a priori models considered within the scope of these known methods are of 1D type (they only depend on the depth), and each group of traces relative to a given lateral position of the medium (CDP) is processed independently from one lateral position to another.

SUMMARY OF THE INVENTION

The method according to the invention extends the approach developed in the two patents mentioned above to the case of several physical quantities or parameters while making possible variation, at any point of the medium, the uncertainty parameters describing the uncertainties about the a priori model, under certain conditions.

The method according to the invention finds applications in various fields, according to the type of waves (elastic waves, electromagnetic waves, etc.) emitted in order to obtain indirect measurements of a medium.

The seismic data used within the scope of the present method may contain information on the amplitude variation with the offset: prestack data, data linked with the technique known to the man skilled in the art referred to as intercept-gradient technique, extracted from the analysis of the variation, etc., or they may not contain them: poststack data.

The method of the invention is notably used with oil exploration in order to obtain quantitative representations and finer images of the structure or configuration of an underground zone, and facilitates identification of hydrocarbon reservoirs.

The objective of the method is to determine an optimum 2 or 3 dimensional (2D or 3D) model representative of the variation, in a heterogeneous medium, of several physical parameters from known data obtained by various methods: recorded data corresponding to waves reflected by the discontinuities of the medium in response to waves propagated therein, and from an a priori (2D or 3D) model of the heterogeneous medium, while taking account of the uncertainties about the recorded data and the a priori model.

The method according to the invention obtains an optimized 2D or 3D model representative of a heterogeneous medium such as the subsoil, described by at least one or more physical parameters or quantities, from recorded data corresponding to waves reflected by the medium and picked up by receivers coupled with the medium, in response to waves transmitted therein by a source, and from a priori information including data measured in situ.

The method comprises constructing a 2D or 3D geometric model describing correlation lines or surfaces, constructing a 2D or 3D a priori model described by one or more physical parameters, from the geometric model and data measured in situ for the physical parameters, at various points of the heterogeneous medium, and forming an optimum model by inversion of the recorded data by taking into account all the a priori information.

With the invention an operator for modeling the uncertainties about the a priori model is selected, which accounts for a degree of confidence for the a priori model variable at any point.

An exponential covariance model is for example selected, which can be variable according to the location in the medium. The covariance model selected may be a 1D model, a 1D model along the correlation lines, A 2D model, a 2D model along the correlation surfaces or a 3D model.

According to one or more embodiments, the exponential covariance model is relative to several parameters.

The model is described by several physical parameters, the covariance operator is for example modified so as to define differences in relation to the a priori model for other physical parameters, so that these differences are independent at each given point of the medium. The covariance model is for example anisotropic, with different correlation lengths in different directions in the medium.

According to an embodiment, formation of the optimum model with several physical parameters is obtained by minimizing a global objective function comprising a term relative to the recorded data, proportional to the square of the norm $L^2$ of the difference between synthetic data and the recorded data, and a term relative to the medium consisting, in the case of a 2D (respectively 3D) model, on the one hand of the square of the norm $L^2$ of the difference in relation to the a priori model expressed by the other physical parameters and, on the other hand, of the square of the norm $L^2$ of the gradient of the difference, projected from the gradient onto the tangent to the local correlation line (respectively onto the plane tangent to the local correlation surface).

In the case of a 3D a priori model, the term relative to the medium can be formed from the square of the norm $L^2$ of the difference in relation to the a priori model measured in relation to the other physical parameters, from the norm $L^2$ of the gradient of the difference, and from the square of the Laplacian operator of the difference.

The method according to the invention can be applied for modeling a zone of the subsoil, with in situ measurements being obtained at various depths in one or more wells through the zone, the waves emitted being elastic waves.

The method according to the invention can also be applied for modeling a zone of a medium where the waves emitted are electromagnetic waves.

The invention does:
on the one hand, estimate several physical parameters describing the heterogeneous medium, which consequently allows better characterization of the medium, and
on the other hand, accounts for very rich a priori information concerning the dimension of the a priori model as well as the uncertainties relative thereto.

BRIEF DESCRIPTION OF THE DRAWINGS

Other features and advantages of the method according to the invention will be clear from reading the description hereafter and results obtained for an embodiment example, with reference to the accompanying drawings wherein:

FIG. 9 is a flow chart of the process of the present invention.

DETAILED DESCRIPTION OF THE PREFERRED EMBODIMENTS

Figure 1:
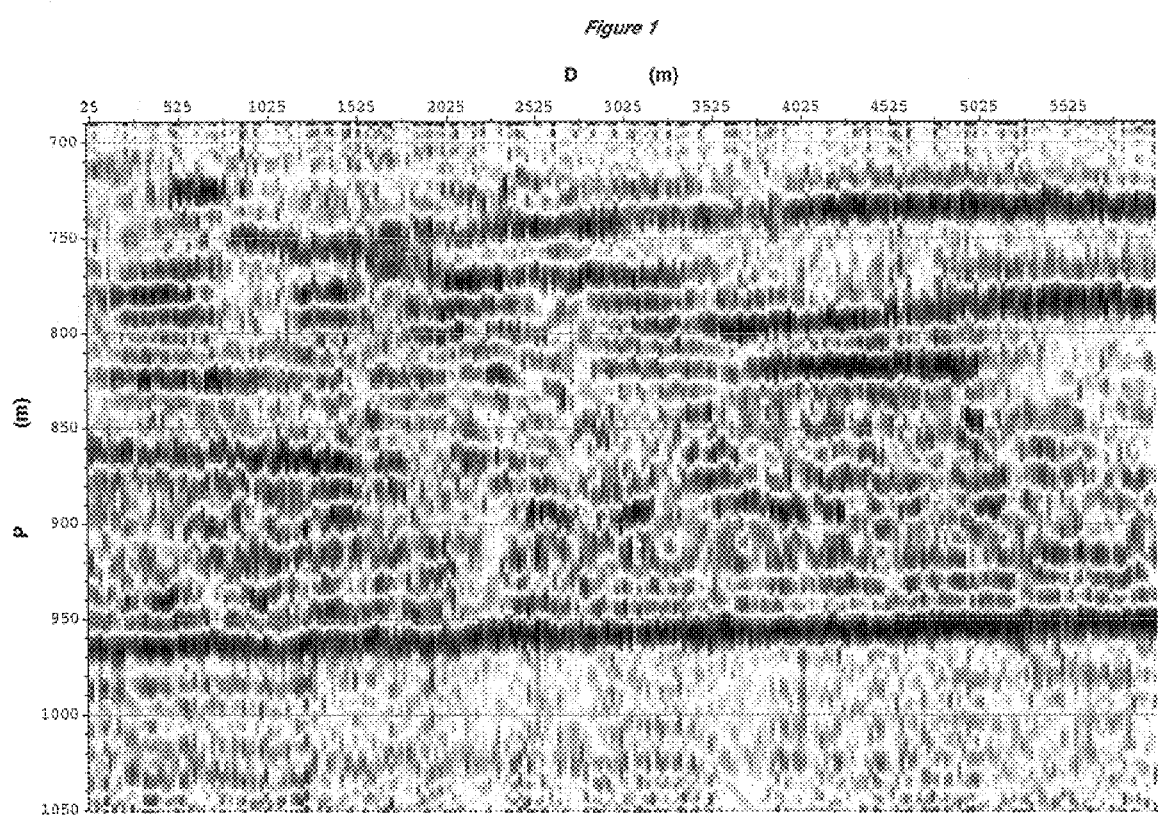
FIGS. 1 and 2 show results obtained with a P impedance and an S impedance by means of a first inversion only from the PP data, i.e. without a priori information.

Consider by way of example an underground zone that is to be imaged by showing how several physical parameters such as the impedances in relation to the P and S waves, the specific mass, etc, vary in the zone. A priori information allowing formation of a 2D or 3D a priori model of the zone described by these physical parameters is available. These a priori information results are, for example, from seismic records conventionally obtained by picking up, by means of seismic receivers Ri coupled with the formation (onshore seismic prospecting) or towed under water by a boat (offshore seismic prospecting), the waves reflected by the discontinuities in response to seismic waves emitted by a source S.

The a priori information is also obtain ed by carrying out logging operations in one or more wells W drilled through the formation. Structural information of geologic nature on the formation is also generally available. The a priori model is optimized by inversion according to the general scheme already used in the aforementioned patents, consisting in minimizing the differences between synthetic records (which are the response of the model during optimization) and the real records available. A global objective function comprising two terms, a seismic term and a geologic term, is therefore minimized by means of a conjugate gradient method for example.

The first term of the objective function, which is the seismic term, measures the difference between the observed data and the synthetic data in the sense of the norm associated with the inverse of the covariance operator, denoted by $C_D$, which describes the uncertainties about the data. The second one measures the difference between the current model and the a priori model, in the sense of the norm associated with the inverse of the covariance operator, denoted by $C_M$, which describes the uncertainties about the models. Minimizing the global objective function allows obtaining, in a single pass, a multi-parameter model compatible with both the seismic data observed and the multi-parameter a priori model.

The method according to the invention allows applying this general modeling scheme to a formation described by several physical parameters. A global objective function whose two terms, seismic and geologic, are defined more in detail hereafter, is used therefore.

The Seismic Objective Function

The seismic objective function measures the difference between each seismic trace and the seismic trace related thereto, in the sense of the norm associated with the inverse of covariance operator $C_D$. It is assumed that the seismic noise is decorrelated from sample to sample. A diagonal covariance operator describing the uncertainty about the data is consequently selected, whose covariance function is:

$$\text{cov}(\delta d(x,t,\overline{\omega}),\delta d(x',t',\overline{\omega}'))=\sigma_S^2 \delta(x-x',t-t',\overline{\omega}-\overline{\omega}')$$

where $\sigma_S^2$ is the variance of the uncertainty about the data, i.e. the variance of the seismic noise, and $\delta d(x,t,\omega)$ represents the difference between the synthetic data and the observed data at the coordinate point $(x,t,\overline{\omega})$ (t representing the time, x the lateral position and a the offset (i.e. the source-receiver distance)).

The operator is invertible, and the norm associated with its inverse allows defining the expression of the seismic objective function by: In the equation, $d^{obs}$ represents the observed data, and the synthetic data d are $$\|d-d^{obs}\|_{C_D^{-1}}^2 = \frac{1}{2\sigma_s^2}\int\int\int (d-d^{obs})^2(x,t,\varpi)dx\,dt\,d\varpi$$

calculated from the datum of a subsoil model m and from a modeling operator G, according to the expression as follows:

$$d=G(m).$$

The Geologic Objective Function

It is well known that a 2D inversion implies a 1D covariance model along the correlation lines, and a 3D inversion implies a 2D covariance model along the correlation surfaces. In order to simplify the presentation hereafter, the 2-dimensional case is selected knowing that the following equations can be readily generalized to the 3D case.

Let $\delta m(p)=m(p)-m^{prior}$ with (p) being the function relative to the difference in relation to the a priori model at point p. The following function is selected as the operator $C_M$ covariance function:

$$\text{cov}(\delta m(p)\delta m(p'))=Q(p)D^{1/2}(p)D^{1/2}(p')Q(p')\exp(-\|\Lambda(p)-\Lambda(p')\|)$$

where $\Lambda$ is a derivative function which is non-zero everywhere, and Q and D are two matrical functions such that, for any point p, Q(p) and D(p) are two respectively orthonormal and diagonal matrices. These two matrices result from the expansion into eigenvector/eigenvalue of the following matrix:

$$\Sigma(p) = \begin{pmatrix} \sigma_1^2 & \rho_{12}\sigma_1\sigma_2 & \cdot & \cdot & \rho_{1k}\sigma_1\sigma_k \\ \rho_{12}\sigma_1\sigma_2 & \cdot & & & \cdot \\ \cdot & & \cdot & & \cdot \\ \cdot & & & \cdot & \rho_{(k-1)k}\sigma_{k-1}\sigma_k \\ \rho_{1k}\sigma_1\sigma_k & \cdot & & \rho_{(k-1)k}\sigma_{k-1}\sigma_k & \sigma_k^2 \end{pmatrix}(p)$$

where k is the number of elastic parameters describing the medium.

The matrix is the variance/covariance matrix describing, at point p, the uncertainty about the parameters (through variance $\sigma_i^2$) and the correlations of these uncertainties (through correlation coefficient $\rho_{ij}$).

By introducing the new parameters defined by $\delta\tilde{m}=D^{-1/2}P^t\delta m$ and by carrying out the change of coordinates $\tilde{p}=\Lambda(p)$, the previous covariance function becomes:

$$\text{cov}(\delta\tilde{m}(\tilde{p}),\delta\tilde{m}(\tilde{p}'))=\exp(-\|\tilde{p}-\tilde{p}'\|)$$

It is well-known to invert an operator having such a covariance function.

The geologic term used here is the norm of $\delta m$ associated with the inverse of the covariance operator described above.

If one wants the uncertainties to be described along correlation lines in 2D, then by denoting the curvilinear coordinates along the correlation lines by s and $\tau$, the direction of s being tangent to the correlation lines:

$$\text{cov}(\delta m(p),\delta m(p'))=Q(p)D^{1/2}(p)D^{1/2}(p')Q(p')\exp(-\|\Lambda(s)-\Lambda(s')\|)\delta(\tau-\tau')$$

the procedure being readily generalized to the 3D case.

In the case, for example, where it can be assumed that $\Lambda(x)=x/\lambda$, $\lambda$ being the correlation length of the uncertainties along the correlation lines, the geologic term of the method is:

where $\vec{s}(x)$ is the vector tangent to the correlation line passing through point x, $$\|\delta m^2\|_{C_M^{-1}}^2 = \sum_{i=1}^{k}\frac{1}{2}\int\left(\frac{1}{\lambda}\delta\tilde{m}_i^2 + \left(\lambda(\vec{\nabla}\delta\tilde{m}_i\cdot\vec{s})\right)^2\right)dx$$

and $\delta\tilde{m}$ is defined by:

$$\delta\tilde{m}=D^{-1/2}P^t\delta m$$

The geologic term selected thus accounts for uncertainty parameters (variances, correlation lengths and correlation coefficient of the inter-parameter uncertainties) which can vary at any point of the domain.

Validation of the Method

It is a synthetic example derived from a real case studied after offshore seismic prospecting operations where the reservoir zone crossed by two wells W1, W2 is included in a 1D surrounding medium.

Synthetic seismic data were simulated and a random noise such that the noise-to-signal ratio is 80% was added thereto. The PP waves reflected on the reservoir constituted the data referred to as <<observed>> data. 240 common depth point (CDP) records were available, with 50 offset values per common depth point with a minimum offset of 50 m, and a maximum offset of 1275 m.

The geometric information of the a priori model was constructed from 3 horizons interpreted on the result in PP impedance, without a priori information. These three horizons defined four geologic units $U_1$, $U_2$, $U_3$ and $U_4$. Correlation lines were defined at all points from a stratigraphic conformity hypothesis along these three boundary horizons.

The information in P and S impedance at wells W1 and W2 with the respective abscissas x=250 m and x=5750 m was then introduced.

An exponential covariance matrix along the correlation lines was selected with a correlation length $\lambda$. The variance of the uncertainty about the difference in relation to the a priori model is selected equal to 10% for the P impedance and 20% for the S impedance.

Figure 2:
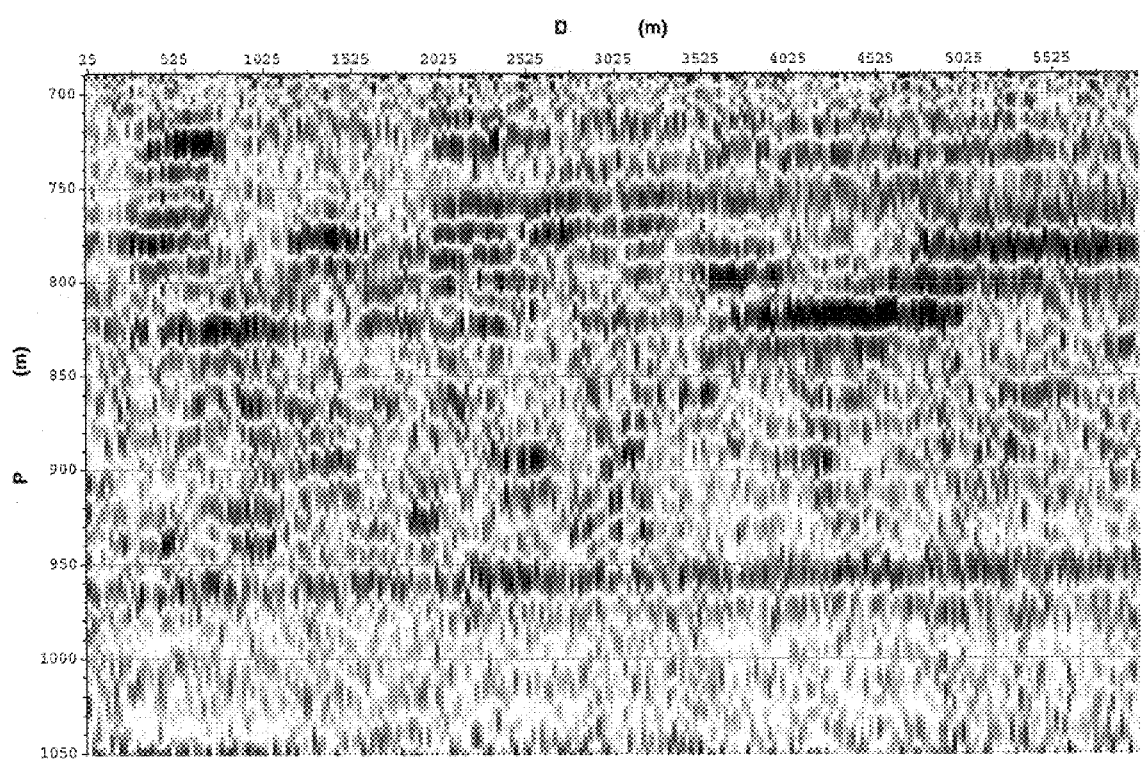
Figure 3:
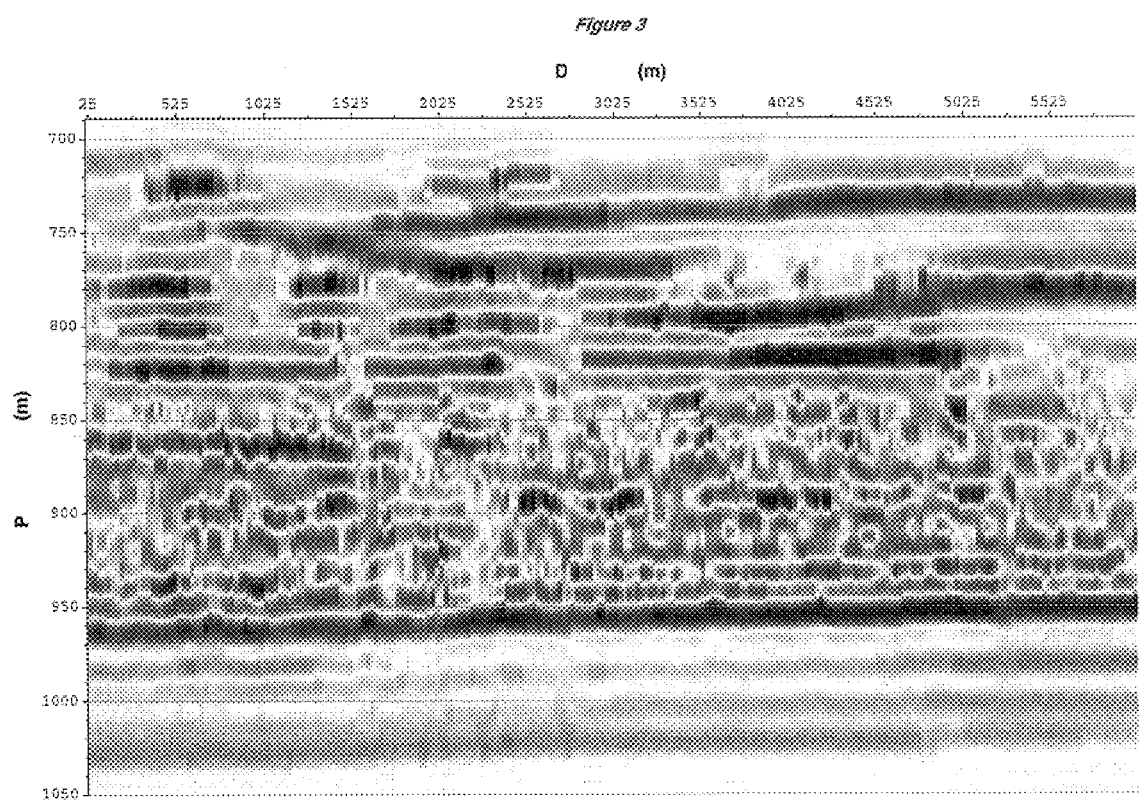
FIGS. 3 and 4 show the P and S impedances of a realistic reservoir after filtering in the frequency band of the seismic survey.
Figure 4:
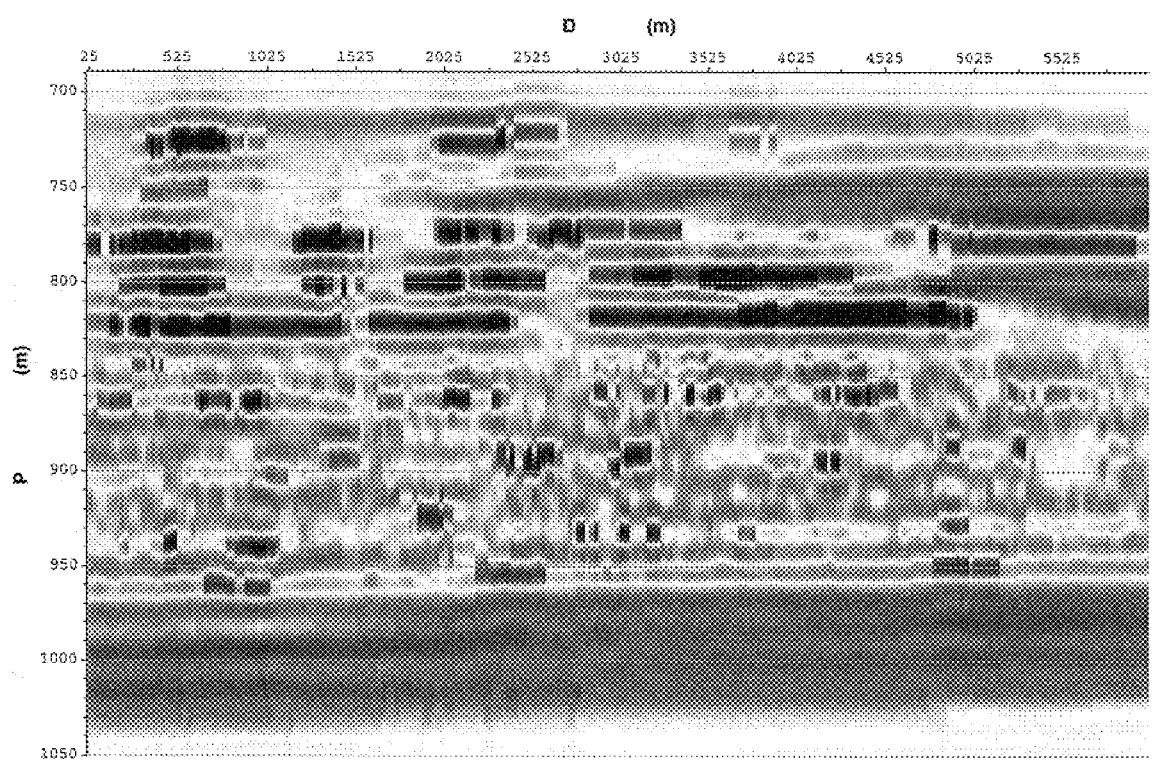
Figure 5:
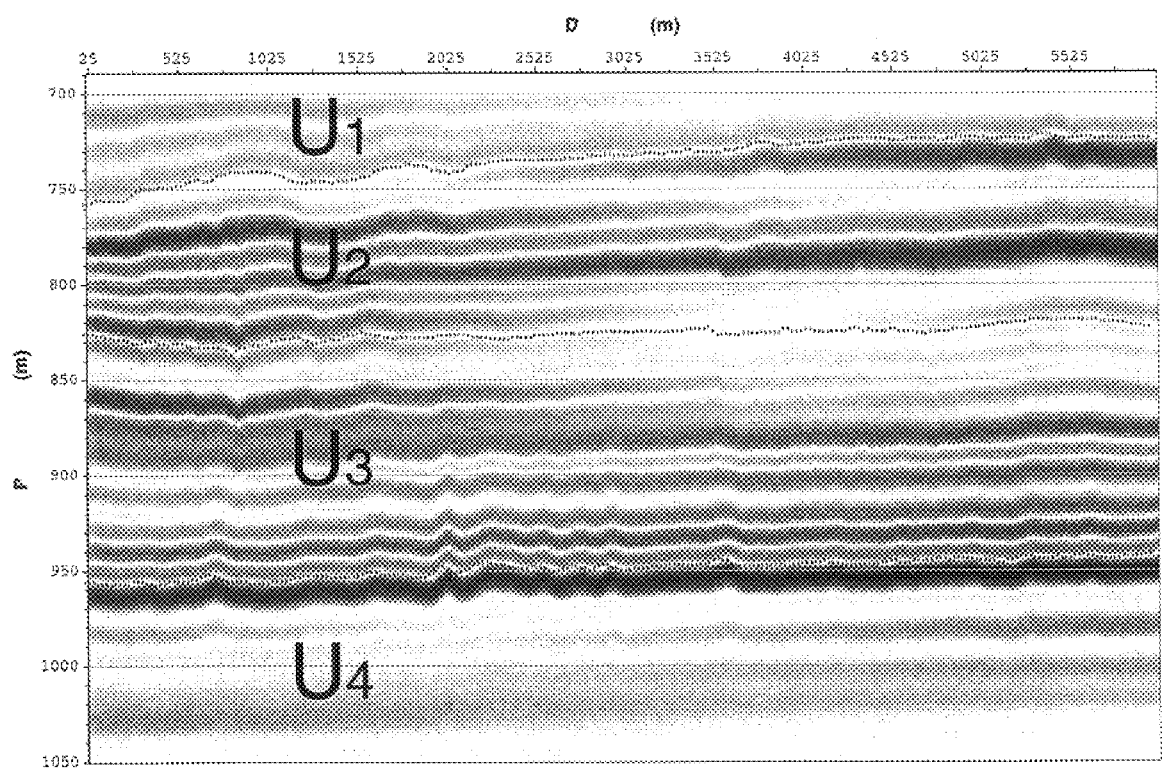
FIGS. 5 and 6 show the P and S impedances of the a priori model calculated by interpolation of the well data along the correlation lines.
Figure 6:
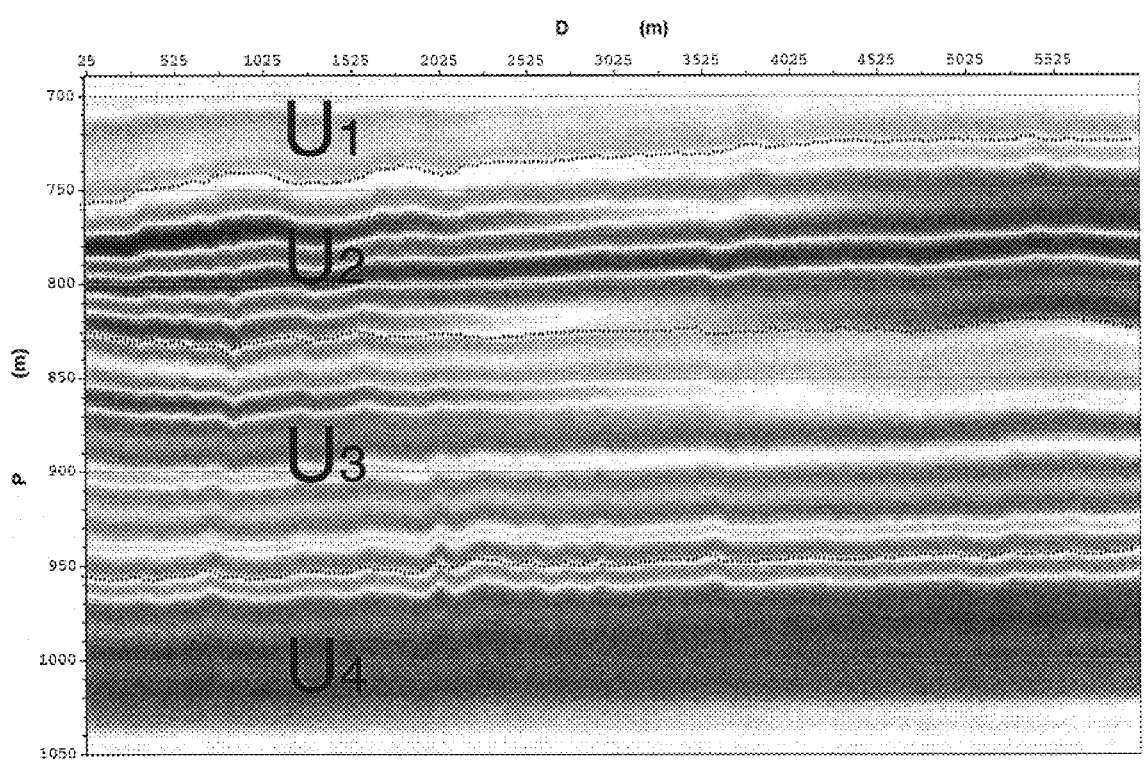
Figure 7:
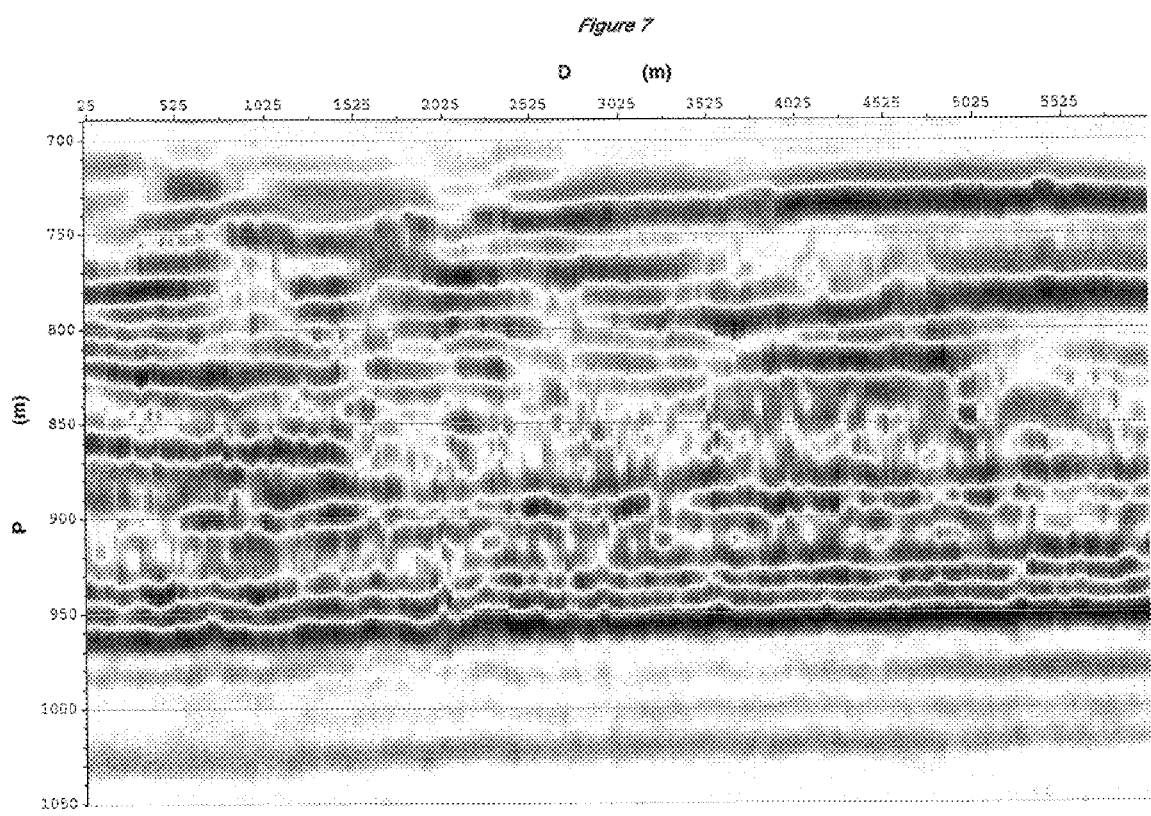
FIGS. 7 and 8 show the Ip and Is results for an inversion with a priori information where the correlation length is 500 m in unit $U_1$ and 50 m in units $U_2$, $U_3$ and $U_4$.
Figure 8:
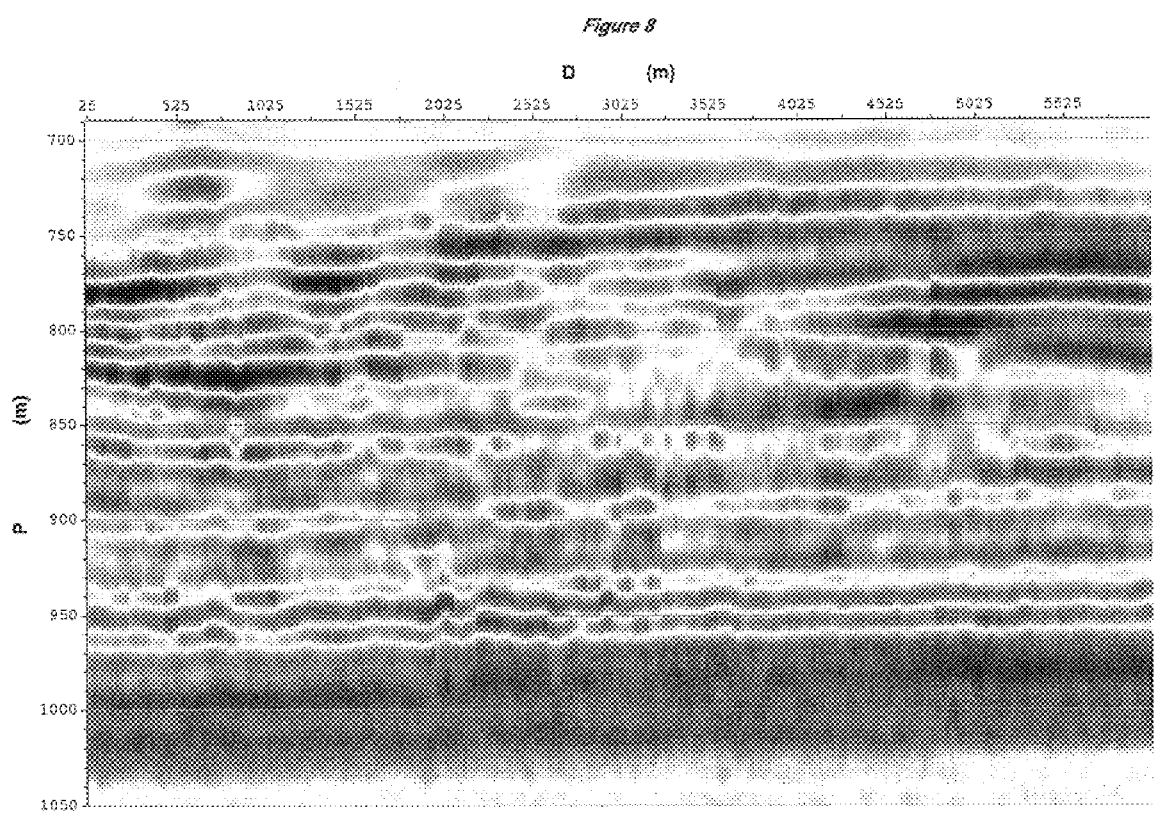

These results with a priori information, compared with those obtained without a priori information, clearly show, on the one hand, how the a priori information can allow improvement of the image obtained in S impedance and, on the other hand, how the a priori information allows reduction of the incoherences between the traces that can be seen in FIGS. 1 and 2.

FIG. 9 illustrates a flow chart of a method of obtaining a 2D or 3D representative optimized model of a heterogeneous medium described by physical parameters or quantities from recorded data corresponding to waves reflected by the medium and picked up by receivers coupled with the medium, in response to waves transmitted therein from a source, and from a priori information including data measured in situ. The method proceeds from starting point 100 to a first step 102 of constructing a 2D or a 3D geometric model describing correlation lines or surfaces. The method proceeds from first step 102 to a second step 104 of constructing a 2D or 3D multi-parameter a priori model described by the physical parameters, from the 2D or 3D geometric model and from data described in situ for the physical parameters, at points of the medium. The method proceeds from the second step 104 to a third step 106 of modeling any uncertainty of the multi-parameters and correlations thereof in the multi-parameter a priori model by a covariance operator which takes into account the degree of confidence variable at any point for all parameters of the multi-parameter a priori model. Finally, the invention proceeds from the third step 106 to the fourth step 108 of forming an optimum multi-parameter model by inversion of the recorded data which takes into account all the a priori information.

What is claimed is:

1. A method of obtaining a 2D or 3D representative optimized model of a heterogeneous medium described by physical parameters or quantities, from recorded data corresponding to waves reflected by the medium and picked up by receivers coupled with the medium, in response to waves transmitted therein from a source, and from a priori information including data measured in situ, the method comprising:

constructing a 2D or 3D geometric model describing correlation lines or surfaces;

constructing a 2D or 3D multi-parameter a priori model described by the physical parameters, from the 2D or 3D geometric model and from data measured in situ for the physical parameters, at points of the medium;

modeling any uncertainty of the parameters and correlations thereof in the a priori model by a covariance operator which takes into account a degree of confidence variable at any point for all parameters of the a priori model; and forming an optimum multi-parameter model by inversion of the recorded data which takes into account all the a priori information.

2. A method as claimed in claim 1, wherein:
the operator for modeling the uncertainties is a multi-parameter exponential covariance operator.

3. A method as claimed in claim 2, wherein:
the multi-parameter exponential covariance operator is variable according to location in the medium.

4. A method as claimed in claim 3, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 2D model, on one hand of the square of the norm $L^2$ of the difference in relation to the a priori model and, on another hand, of the square of the norm $L^2$ of a gradient of the difference in relation to the a priori model, projected in a relation onto a tangent to a local correlation line.

5. A method as claimed in claim 3, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 3D model, on one hand of the square of the norm $L^2$ of the difference in relation to the a priori model and, on another hand, of the square of the norm $L^2$ of a gradient of the difference in relation to the a priori model, projected onto a plane tangent to a local correlation surface.

6. A method as claimed in claim 5, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

7. A method as claimed in claim 5, wherein:
for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

8. A method as claimed in claim 3, comprising:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for one of a 2D model, on one hand, of the square of the norm $L^2$ of the difference in relation to the a priori model expressed by the other physical parameters and, on another hand, of the square of the norm $L^2$ of a gradient of the difference in relation to the a priori model, projected onto the tangent to the local correlation line.

9. A method as claimed in claim 3, comprising:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for a 3D model, on one hand, of the square of the norm $L^2$ of the difference in relation to the a priori model expressed by the other physical parameters and, on another hand, of the square of the norm $L^2$ of a gradient of the difference in relation to the a priori model, projected onto a plane tangent to a local correlation surface.

10. A method as claimed in claim 9, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

11. A method as claimed in claim 9, wherein:
for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to a priori model.

12. A method as claimed in claim 2, wherein:
the covariance model is a one of 1D model, 1D model along correlation lines, a 2D model, 2D model along correlation surfaces, or a 3D model.

13. A method as claimed in claim 2, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 2D model, on one hand of the square of the norm $L^2$ of the difference in relation to the a priori model and, on another hand, of the square of the norm $L^2$ of a gradient of the difference in relation to the a priori model, projected onto a tangent to a local correlation line.

14. A method as claimed in claim 2, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 3D model, on one hand of the square of the norm $L^2$ of the difference in relation to the a priori model and, on another hand, of the square of the norm $L^2$ of a gradient of the difference in relation to the a priori model, projected onto a plane tangent to a local correlation surface.

15. A method as claimed in claim 14, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

16. A method as claimed in claim 14 wherein:
for a 3D a priori model, a term relative to the medium is proportional to the square of the norm $L^2$ of the difference in relation to the a priori model measured in relation to other physical parameters, the norm. $L^2$ of the gradient of the difference in relation to the a priori model and the square of a Laplacian operator of the difference in relation to the a priori model.

17. A method as claimed in claim 2, comprising:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for one of a 2D model, on one hand, of the square of the norm $L^2$ of the difference in relation to the a priori model expressed by the other physical parameters and, on another hand, of the square of the norm $L^2$ of a gradient of the difference in relation to the a priori model, projected onto the tangent to the local correlation line.

18. A method as claimed in claim 2, comprising:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for a 3D model, on one hand, of the square of the norm $L^2$ of the difference in relation to the a priori model expressed by the other physical parameters and, on another hand, of the square of the norm $L^2$ of a gradient of the difference in relation to the a priori model, projected onto a plane tangent to a local correlation surface.

19. A method as claimed in claim 18, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

20. A method as claimed in claim 18, wherein:
for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

21. A method as claimed in claim 2, wherein:
the medium is a subsoil zone and in situ measurements are obtained at depths of the subsoil in at least one well through the zone.

22. A method as claimed in claim 2, wherein:
the waves transmitted in the medium are elastic waves.

23. A method as claimed in claim 2, wherein:
the waves transmitted in the medium are electromagnetic waves.

24. A method as claimed in claim 1, wherein:
the covariance model is a one of 1D model, 1D model along correlation lines, a 2D model, 2D model along correlation surfaces, or a 3D model.

25. A method as claimed in claim 24, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 2D model, on one hand of the square of the norm $L^2$ of the difference in relation to the a priori model and, on another hand, of the square of the norm $L^2$ of a gradient of the difference in relation to the a priori model, projected onto a tangent to a local correlation line.

26. A method as claimed in claim 24, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 3D model, on one hand of the square of the norm $L^2$ of the difference in relation to the a priori model and, on another hand, of the square of the norm $L^2$ of a gradient of the difference in relation to the a priori model, projected onto a plane tangent to a local correlation surface.

27. A method as claimed in claim 26, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

28. A method as claimed in claim 26, wherein:
for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

29. A method as claimed in claim 24, comprising:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for one of a 2D model, on one hand, of the square of the norm $L^2$ of the difference in relation to the a priori model expressed by the other physical parameters and, on another hand, of the square of the norm $L^2$ of a gradient of the difference in relation to the a priori model, projected onto the tangent to the local correlation line.

30. A method as claimed in claim 24, wherein:
modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for a 3D model, on one hand, of the square of the norm $L^2$ of the difference in relation to the a priori model expressed by the other physical parameters and, on another hand, of the square of the norm $L^2$ of a gradient of the difference in relation to the a priori model, projected onto a plane tangent to a local correlation surface.

31. A method as claimed in claim 30, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

32. A method as claimed in claim 30, wherein:
for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

33. A method as claimed in claim 1, comprising:
modifying the covariance operator to define differences in relation to the a priori model for other physical parameters, so that the differences are independent at any point of the medium.

34. A method as claimed in claim 33, wherein:
the medium is a subsoil zone and in situ measurements are obtained at depths of the subsoil in at least one well through the zone.

35. A method as claimed in claim 33, wherein:
the waves transmitted in the medium are elastic waves.

36. A method as claimed in claim 33, wherein:
the waves transmitted in the medium are electromagnetic waves.

37. A method as claimed in claim 15, wherein:
the covariance operator is anisotropic with different correlation lengths in different directions in the medium.

38. A method as claimed in claim 37, wherein:
the medium is a subsoil zone and in situ measurements are obtained at depths of the subsoil in at least one well through the zone.

39. A method as claimed in claim 37, wherein:
the waves transmitted in the medium are elastic waves.

40. A method as claimed in claim 37, wherein:
the waves transmitted in the medium are electromagnetic waves.

41. A method as claimed in claim 1, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 2D model, on one hand of the square of the norm $L^2$ of the difference in relation to the a priori model and, on another hand, of the square of the norm $L^2$ of a gradient of the difference in relation to the a priori model, projected in a relation onto a tangent to a local correlation line.

42. A method as claimed in claim 41, wherein:
the medium is a subsoil zone and in situ measurements are obtained at depths of the subsoil in at least one well through the zone.

43. A method as claimed in claim 41, wherein:
the waves transmitted in the medium are elastic waves.

44. A method as claimed in claim 41, wherein:
the waves transmitted in the medium are electromagnetic waves.

45. A method as claimed in claim 1, wherein:
formation of the optimum multi-parameter model is obtained by minimizing a global objective function comprising a term relative to the recorded data, proportional to a square of the norm $L^2$ of the difference between synthetic data and the recorded data, and a term relative to the medium, for a 3D model, on one hand of the square of the norm $L^2$ of the difference in relation to the a priori model and, on another hand, of the square of the norm $L^2$ of a gradient of the difference in relation to the a priori model, projected onto a plane tangent to a local correlation surface.

46. A method as claimed in claim 45, wherein:
for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

47. A method as claimed in claim 45, wherein:

for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

48. A method as claimed in claim 1, comprising:

modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for one of a 2D model, on one hand, of the square of the norm $L^2$ of the difference in relation to the a priori model expressed by the other physical parameters and, on another hand, of the square of the norm $L^2$ of a gradient of the difference in relation to the a priori model, projected onto the tangent to the local correlation line.

49. A method as claimed in claim 1, comprising:

modifying the covariance operator to define differences in relation to the a priori model for other physical parameters, so that the differences are independent at any point of the medium, the formation of the optimum model with parameters being obtained by minimizing a global objective function comprising a term relative to the recorded data, proportional to the square of a norm $L^2$ of a difference between synthetic data and the recorded data, and a term relative to the medium, for a 3D model, on one hand, of the square of the norm $L^2$ of the difference in relation to the a priori model expressed by the other physical parameters and, on another hand, of the square of the norm $L^2$ of a gradient of the difference in relation to the a priori model, projected onto a plane tangent to a local correlation surface.

50. A method as claimed in claim 49, wherein:

for a 3D a priori model, a term relative to the medium is proportional to the square of the norm $L^2$ of the difference in relation to the a priori model, a norm $L^2$ of the gradient of the difference in relation to the a priori model and the square of a Laplacian operator of the difference in relation to the a priori model.

51. A method as claimed in claim 49, wherein:

for a 3D a priori model, a term relative to the medium is proportional to the square of the norm $L^2$ of the difference in relation to the a priori model measured in relation to other physical parameters, the norm $L^2$ of the gradient of the difference in relation to the a priori model and the square of a Laplacian operator of the difference in relation to the a priori model.

52. A method as claimed in claim 1, wherein:

the medium is a subsoil zone and in situ measurements are obtained at depths of the subsoil in at least one well through the zone.

53. A method as claimed in claim 1, wherein:

the waves transmitted in the medium are elastic waves.

54. A method as claimed in claim 1, wherein:

the waves transmitted in the medium are electromagnetic waves.

* * * * *